United States Patent Office 3,248,446
Patented Apr. 26, 1966

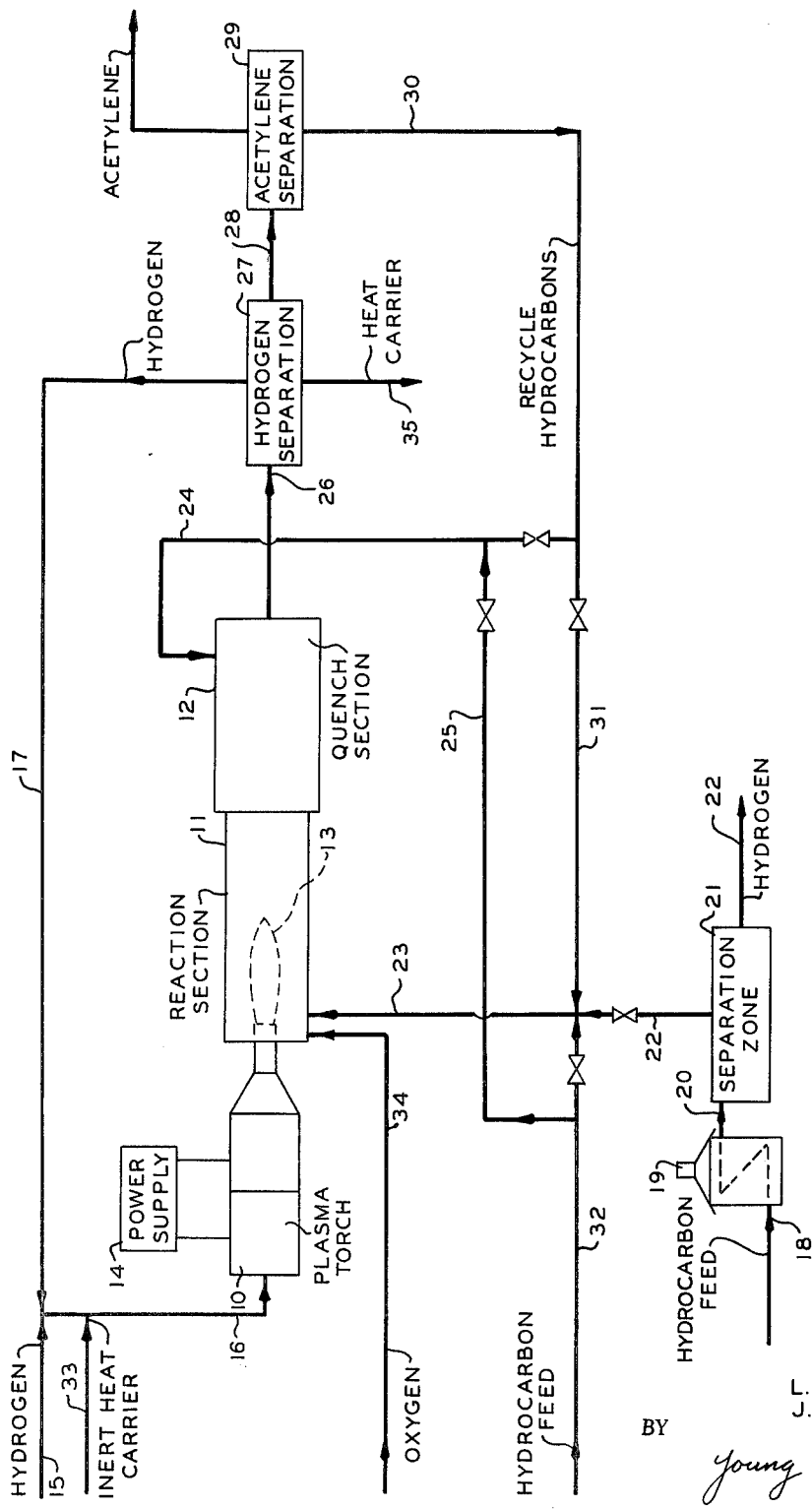

3,248,446
PLASMA STREAMS AND METHOD FOR UTILIZING SAME
Lyle W. Pollock and John W. Begley, Bartlesville, Okla., assignors to Phillips Petroleum Company, a corporation of Delaware
Filed Oct. 22, 1962, Ser. No. 231,923
5 Claims. (Cl. 260—679)

This invention relates to improvements for carrying out chemical reactions at high temperatures. In accordance with one aspect, this invention relates to plasma stream torches and methods of using same. In accordance with another aspect, this invention relates to improved methods for forming acetylene utilizing plasma stream torches.

Streams of plasma, which has been defined as consisting of neutral gas, ions and electrons, at high temperatures, have been observed as physical phenomena for many years, for example, in connection with electric arcs. Such streams have been employed to achieve very high temperatures for short periods of time. Plasma jets or streams have commercial use in arcs scuh as cutting, welding, metalizing, ceramic coating, surface treating, sintering, chemical synthesis, etc. The utility of plasma streams or jets in various commercial operations has been limited to some extent due to the high cost of electrical energy required to produce the high temperature plasma stream. An important field of activity to which the present application is directed is the field of high temperature chemical reactions whereby reactants are contacted with a high temperature plasma stream or jet.

According to the invention, improved methods are provided for contacting reactants with a plasma stream or jet whereby the amount of energy required for the plasma jet to effect conversion of the reactant is materially reduced. Thus, according to the invention, the use of plasma jets or streams in chemical synthesis on a commercial basis is now feasible.

Accordingly, an object of this invention is to provide economical and practical methods for utilizing plasma torches for chemical reactions.

Another object of this invention is to provide practical methods for forming acetylene utilizing plasma jets or streams.

A further object of this invention is to provide improved methods whereby the energy required for producing plasma jets or streams is materially reduced.

A still further object of this invention is to provide a method for improving heat transfer in a plasma stream apparatus.

Other objects and aspects as well as the several advantages of the invention will be apparent to those skilled in the art upon a further consideration of the specification, the drawing and the claims.

Broadly, according to the invention, chemical reactions, particularly hydrocarbon cracking reactions, are carried out in a plasma stream apparatus in an improved manner by subjecting at least a portion of the reactant feed to heating at cracking conditions prior to contacting with the plasma jet or stream. It has been found that the required electrical energy per pound of product is materially reduced by first preheating at least a portion of the feed to cracking temperature whereby a portion of the feed is converted to a less saturated reactant material. Preheating of the reactant feed can be accomplished in a cracking zone external to the plasma stream torch, or by introducing at least a portion of the feed into the plasma stream effluent as quench material.

In accordance with the invention, a hydrocarbon feed comprised of normally gaseous hydrocarbons is preheated to cracking temperatures, e.g., in a tube furnace for a period of time sufficient to convert and crack a substantial portion of the paraffin hydrocarbons present in the feed to olefinic hydrocarbons and then the preheated feed thus obtained is contacted with a high temperature hydrogen plasma stream under conditions to form acetylene and other light hydrocarbons. The effluent from the hydrogen plasma stream contacting can be passed to suitable separation facilities for (1) recovery and recycle of hydrogen, (2) recovery of acetylene as product, and (3) recovery and recycle of other light hydrocarbons to the plasma stream apparatus either as feed or as quench or both. According to the above embodiment, combustion energy is substituted for part of the electrical energy employed in the plasma torch by preheating and cracking the hydrocarbon feed stream in a conventional furnace. This embodiment of the invention expands the utility of the acetylene producing process by making additional feedstocks not in themselves suitable for economical handling at plasma jet temperatures.

Also, in accordance with the invention in the production of acetylene a hydrocarbon feed for a plasma torch stream is preheated by introducing the feed into the effluent from the plasma torch so as to simultaneously quench the plasma effluent stream and effect cracking of the feed to form an effluent from the plasma torch containing acetylene and other light hydrocarbons including unsaturated or olefinic materials, non-acetylenic hydrocarbons are recovered from the effluent and recycled as feed to the hydrogen plasma torch. It is also within the scope of the invention to utilize only a portion of the feed as quench, thereby cracking only a part of the feed, the remainder being introduced as reactant feed directly into the plasma stream, either with or without preheating to cracking temperature. It is also within the scope of the invention to preheat part of the feed in an external cracking furnace and preheat the remainder of the feed by introducing same as quench into the plasma torch effluent.

Quenching of the plasma stream with at least a portion of the hydrocarbon feed makes use of some of the heat in the plasma stream effluent to crack a hydrocarbon feed to less saturated materials and at the same time minimize the loss of acetylene in the plasma stream effluent by hydrogenation reaction. Moreover, the overall process efficiency is improved since the energy required from the plasma jet or stream to produce acetylene is reduced.

Still further in accordance with the invention, a solid substance, such as finely divided, Si, $SiO_2$, $Al_2O_3$, $W_2C$, etc. is fed to a plasma jet apparatus together with the plasma forming gas in order to improve the heat transfer efficiency of the plasma forming apparatus. The selected solid heat carrier or additive material should have a heat of transition as well as sensible heat within the range of temperatures between plasma jet and the cracking reaction, e.g., temperatures of the order of 2500 to 3500° F. In accordance with this embodiment of the invention, the solid inert heat carrier materials are heated in the plasma jet by the plasma flame and then cooled in the reaction section of the plasma forming apparatus. The sensible heat of the inert heat carrier above the cracking temperature as well as the heat of transition is released to the cracking reaction. Heat transferred is by convection and radiation. An ancillary advantage of this embodiment of the invention is the reduction of the solid inert materials to more valuable forms.

Alternatively, electrical energy in plasma forming generators can be materially reduced by introducing oxygen into a hydrogen plasma so that the heat of combustion generated or released is utilized to form the plasma stream. The plasma stream obtained from such an apparatus can be used for chemical synthesis, for example, conversion of light hydrocarbons to acetylene as well as for other commercial operations.

According to the present invention, endothermic reactions can be conducted with particular advantage utilizing relatively inert gases such as argon, helium, hydrogen, or mixtures thereof as the plasma forming material which transfers the energy. The present invention is particularly advantageous for the preparation of unsaturated organic compounds, especially acetylenic materials containing at least two carbon atoms. It is also possible to a small extent to produce ethylene according to the invention. Of the above mentioned plasma forming materials, hydrogen has been found most suitable for the conversion of less saturated hydrocarbons to more unsaturated hydrocarbon products although nitrogen can also be used. According to the invention, yields of acetylene as high as 75 percent and higher, can be achieved by contacting a partially cracked light hydrocarbon with a high temperature plasma stream.

As indicated above, the present invention is particularly suitable for use in the production of acetylene. Suitable hydrocarbon reactants that can be employed as starting materials for the production of acetylene include saturated hydrocarbons such as methane, ethane, propane, butane, pentane, etc. or mixtures of these. Also, as indicated above, the hydrocarbon reactant material is first subjected to thermal cracking prior to contacting with the plasma stream, thus the thermally treated reactant will contain unsaturated hydrocarbons such as ethylene, propylene, butylene, isobutylene and the like depending upon the hydrocarbon fractions subjected to cracking conditions prior to contacting with the plasma stream.

Plasma flame generators and plasma stream apparatus are known in the art and do not form a part of the invention other than in combination with the use of the plasma stream to effect chemical reactions. Thus, any plasma stream apparatus known in the art can be utilized in the invention so long as the apparatus produces a high temperature plasma which effects conversion of the materials contacted therewith as set forth herein. Suitable plasma flame generators that can be employed are disclosed in U.S. Patents 2,960,594, Thorpe, issued November 15, 1960, and U.S. 2,922,869, Giannini et al., issued January 26, 1960.

A plasma stream can be defined as consisting of neutral gas, ions and electrons at high temperatures, and can be produced by passing a suitable gas, such as argon, helium, hydrogen, etc. through an arc produced by high density current between two suitable electrodes. Such a plasma arc torch is capable of attaining temperatures in the range of 3,000 to 30,000° F. and in this temperature range any hydrocarbon feed which is introduced into the plasma jet becomes vaporized and subjected to cracking temperatures.

A better understanding of the invention will be obtained upon reference to the accompanying schematic drawing which illustrates several embodiments of the invention for the formation of acetylene by contacting a hydrocarbon feed with a hydrogen plasma stream.

Referring now to the drawing, plasma torch apparatus generally designated reference numeral 10 is connected to a reaction section 11 and quench section 12. Torch 10 can be any suitable known plasma flame generator capable of generating high temperature plasma stream 13 shown extending into reaction section 11. Torch 10 is connected to a suitable electrical power supply 14 connected to electrodes (not shown) within plasma torch 10.

A plasma forming gas, such as hydrogen, is introduced into torch 10 by way of lines 15 and 16. Recycle hydrogen recovered from the plasma stream effluent can be introduced into line 15 by way of line 17. Hydrogen introduced into torch 10 by way of line 16 is heated by an electric arc within torch 10 above its disassociation temperature and exits torch 10 as plasma flame 13 in reaction section 11.

According to the invention, a hydrocarbon feed, for example, a methane-ethane fraction, is passed by way of line 18 to cracking furnace 19 wherein the feed is subjected to a cracking temperature sufficient to crack and convert at least a portion of the ethane to olefinic hydrocarbons. Conditions of temperature, pressure and residence time within the cracking furnace are well known in the art and need not be described in detail here. However, in general, cracking temperatures of the order of 1000 to 1700° F. are ordinarily employed for the cracking of light hydrocarbon gases such as ethane, propane, butane, etc. Likewise, pressures employed are generally above atmospheric.

The hydrocarbon feed subjected to cracking in furnace 19 is withdrawn from furnace 19 by way of line 20 and passed to separation zone 21 wherein hydrogen liberated from the feed in the furnace is separated out by way of line 22 and can be recycled to torch 10 as part of the plasma forming material. The cracked hydrocarbon stream in line 20 is subjected to conventional separation techniques such as fractionation, solvent extraction, etc., in zone 21. The cracked hydrocarbon feed stream reduced in hydrogen content is withdrawn from zone 21 and passed by way of valve line 22 and line 23 to reaction section 11 and therein contacted with plasma stream 13. Within reaction section 11, the hydrocarbon feed is contacted with the high temperature hydrogen plasma stream thereby effecting further cracking of the hydrocarbon feed to produce an effluent containing acetylene, hydrogen, carbon, ethylene, methane and other light hydrocarbon gases. The contact time between the hydrocarbon feed and the plasma stream is relatively short, i.e., in the order of 0.0001 to 0.1 second, usually 0.001 to 0.05 second. Downstream from the contacting with the plasma stream, the plasma effluent is quenched in section 12 to a temperature below the reaction or cracking temperature of the hydrocarbon feed.

Also according to the invention, quench of the plasma stream effluent in section 12 is achieved by recycling either a portion of the light hydrocarbons recovered from the plasma stream effluent by way of lines 24 and 30 or passing a portion of the hydrocarbon feed, either with or without previous preheating to cracking temperatures, by way of valved lines 25 and 24. Quenching of the plasma stream effluent with cold reactant hydrocarbon not only rapidly cools the plasma effluent below the cracking temperature of ethylene, acetylene, etc. for example, but also effects cracking of some of the hydrocarbons in the quench upon immediate contact with the plasma effluent stream. Quenching with hydrocarbon feed achieves at least partial preheating and cracking of the feed since these materials are subsequently recovered and recycled. Moreover, quenching of the plasma stream ffluent with hydrocarbons, either recycle or fresh, minimizes the loss of acetylene by dehydrogenation reaction in the effluent stream. Temperatures ordinarily encountered in quench section 12 will be of the order of 2500° F. or more.

The quenched plasma stream is removed from section 12 by way of line 26 and passed to hydrogen separation zone 27 wherein hydrogen is recovered and recycled to torch 10 by way of lines 16 and 17. Any known method for separating hydrogen from light hydrocarbon gases can be utilized in zone 27 including such means as permeable membrane, fractionation, solvent extraction, adsorption, etc. The plasma stream effluent substantially freed of hydrogen is removed from zone 27 by way of line 28 and passed to acetylene separation zone 29 wherein acetylene is separated and recovered as product. Solvent extraction, fractionation or other suitable known separation systems can be used in zone 29 for recovery of acetylene. Hydrocarbons such as methane, ethylene, propylene, etc., in the plasma stream effluent other than acetylene are recovered in zone 29 and recycled by way of line 30, either as quench by way of line 24 or as feed by way of lines 23 and 31. If all of the hydrocarbon feed is first thermally cracked in furnace 19 and then passed to reaction section 11, all or part of the recycle hydrocarbons in line 30 can be used as quench or as part of the feed as desired.

When desired, all of the hydrocarbon feed can be preheated by utilizing same as quench in section 12. When carrying out the invention in accordance with this embodiment, hydrocarbon feed, for example, methane, methane-ethane mixture, etc., is introduced into the system by way of valved lines 32, 25 and 24 and introduced into quench section 12. The cold hydrocarbon feed effects quenching of the plasma stream effluent as well as preheating the hydrocarbon feed to cracking temperatures so as to convert at least a part of the feed to less saturated compounds. According to this embodiment, the effluent is recovered in zones 27 and 29 as previously described. The recycle hydrocarbons recovered in zone 29 by way of line 30 are recycled as feed through lines 31 and 23 to reaction section 11 for contact with plasma stream 13. If desired, a portion of the recycle hydrocarbon stream can be mixed with the fresh hydrocarbon feed in line 25 passed to quench section 12 through line 24. Several advantageous functions are accomplished by the above embodiment of the invention, namely (1) quenching is accomplished without the introduction of undesirable contaminants, (2) cool or chilled feed stock provides a rapid and complete quench which increases yield of acetylene, (3) methane, and ethane, etc., are at least partially cracked to materials more readily converted to acetylene at the high temperature treatment or contacting with the plasma, and (4) there is excellent utilization and conservation of the electrical energy of the plasma jet process.

As indicated previously, a finely divided inert heat carrier can also be utilized in the invention to improve heat efficiency in the plasma stream. Suitable substances that can be used include Si, $SiO_2$, $Al_2O_3$, $W_2C$, etc. The addition of these materials to a plasma former is particularly advantageous since the efficiency of a thermal cracking process operating at temperatures of 2500 to 3500° F. is improved. The finely divided materials are ordinarily of 60–325 mesh size (U.S. Standard). The inert heat carrier materials are introduced into the system by way of line 33 along with hydrogen in line 16 into torch 10. The finely divided heat carrier material will pass through the reaction section and quench section along with the plasma and can be separated out of the effluent in zone 27 by way of line 35. If desired, the heat carrier can be recycled to torch 10.

Further according to the invention, the thermal efficiency of the plasma torch can be improved, i.e., the required electrical energy per pound of product can be reduced by introducing oxygen by way of line 34 into reaction section 11. The heat of combustion of oxygen and hydrogen in the reaction section will supply some of the heat to crack the hydrocarbon feed thus reducing the amount of electrical power ordinarily required to effect heating of the plasma and hydrocarbon reactant.

The plasma stream apparatus or generator that can be employed according to the invention, is preferably energized with direct current. However, alternating current can be used. The plasma forming gas employed in the torch will form a sheath around the arc within the torch. The plasma forming gas is converted in the nozzle of the torch to a free plasma and leaves the nozzle and passes out of contact with the arc as a free plasma stream being projected from the nozzle. The plasma forming gas is passed into the reaction chamber 11, preferably at a velocity and/or pressure sufficient that the same will emerge from the nozzle as a free plasma stream having a velocity of at least 5 and preferably at least 50 feet per second and most preferably of at least 500–1000 feet per second. Plasma flame temperatures ranging from 3000° F. to 30,000° F. can be achieved depending upon the type of apparatus employed, the plasma forming gas and other considerations. If desired, mixtures of various gases or other materials can be used as the plasma forming material for operational reasons rather than chemical action reasons. For example, a mixture of hydrogen and argon has been successfully operated for reducing the arc voltage required by the use of pure hydrogen.

Ordinarily the voltage impressed between the nozzle of the torch and the plain electrodes is in the range of 20 volts to 500 volts so as to effect current flow between the nozzle and electrode in the range of 20 amperes to 2000 amperes. The electrode positions are important to the efficient and stable operation of the plasma generating apparatus. It is generally desirable for such apparatus to convert as much as possible of the plasma gas flowing through the apparatus into the actual plasma. This avoids waste of gas and also avoids the detrimental cooling effect of gas below plasma temperature. For the proper operation of a plasma torch apparatus, it is important that the flow of plasma gas be properly coordinated with the flow of electric current to the arc. It is usually advisable to start the plasma gas flowing before igniting the arc and then to only ignite the arc at low amperage, afterwards gradually increasing the current input to the arc. It is sometimes advisable to arrange to perform these functions automatically using known automation expedients to avoid damage to the equipment which might result from the failure of the operator to adjust the gases and current flow properly. Both the electric arc stream and the random plasma stream emit ultraviolet and infrared frequency radiation. It is therefore advisable for operators in the vicinity of the apparatus to use adequate radiation protection.

A better understanding of the invention will be obtained upon further study of the following illustrative example which is not intended, however to be unduly limitative of the invention.

*Specific example*

An ethane feed is subjected to thermal cracking in a furnace at a temperature of about 1500° F. Based on 72 percent ethane destroyed, the yields are

| | Mols/100 mols cracked |
|---|---|
| $H_2$ | 94 |
| $CH_4$ | 20 |
| $C_2H_2$ | 2.2 |
| $C_2H_4$ | 76.1 |
| $C_2H_6$ | 39 |
| $C_3H_4$ | 0.1 |
| $C_3H_6$ | 1.1 |
| $C_3H_8$ | 0.5 |
| $C_4H_6$ | 1.7 |
| $C_4H_8$ | 0.2 |
| $C_4H_{10}$ | 0.2 |
| $C_5^+$ | 1.2 |

The furnace effluent comprising the above cracked gas is quenched to a temperature of about 1000° F. prior to contacting with a high temperature hydrogen plasma stream.

The cracked gas at a temperature of about 1000° F. is contacted with a hydrogen plasma stream (plasma temperature of about 9000° F.) to convert hydrocarbons in the feed gas to acetylene. The power to the plasma torch is about 60 kw. and the arc voltage is about 120. Based on 65% conversion to acetylene, the electrical energy requirement is 2.48 kw. h./# acetylene.

For comparative purposes, an ethane feed is contacted directly with the high temperature hydrogen plasma stream without precracking. Based on the same conversions the electrical energy requirement is 3.48 kw. h./# acetylene. Thus, it can be seen that the electrical energy required to produce each pound of acetylene according to the invention is reduced by 1.0 kw. h.

Although the present invention has been described employing an electrode-type plasma forming apparatus, it is also within the scope of the invention to employ other known plasma generating devices. For example, an electrodeless torch such as the induction-coupled plasma torch described in the Journal of Applied Physics, Volume 32, No. 5, May 1961, pages 821–824, Thomas B. Reed, can also be utilized in practicing the instant invention. Basically, the induction plasma torch, in its simplest form, is a quartz tube, open at one end, with gas supplied at the other end and an RF coil of a few turns surrounding the tube at the center which serves to couple energy into the plasma.

It will be evident to those skilled in the art that many variations and modifications can be practiced upon consideration of the foregoing disclosure. Such variations and modifications are believed to be within the spirit and scope of the present invention.

We claim:

1. A process for the production of acetylene which comprises introducing a hydrocarbon feed comprised principally of methane and ethane into the quench section of a high temperature hydrogen plasma stream former so as to simultaneously effect cooling of said plasma stream and crack and convert at least a portion of said hydrocarbon feed to olefinic hydrocarbons, removing an effluent from said quench section and separating hydrogen therefrom, subjecting said effluent after removal of hydrogen to separation to recover acetylene therefrom, and recycling hydrocarbons recovered from said separation as reactant feed to said plasma stream former and contacting same with said plasma stream to convert same to acetylene and other light hydrocarbons.

2. A process according to claim 1 wherein a portion of the hydrocarbon stream recovered from said acetylene separation is utilized simultaneously as quench for cooling said plasma effluent to below the cracking temperature of ethane and to convert additional hydrocarbon materials in said recycle to less saturated hydrocarbons.

3. A process for producing acetylene which comprises heating a portion of a hydrocarbon feed comprised principally of normally gaseous paraffin hydrocarbons in a preheating step to cracking temperature for a period of time sufficient to convert and crack a substantial portion of said paraffinic hydrocarbons to olefinic hydrocarbons, contacting said preheated feed with a high-temperature hydrogen plasma stream formed by a plasma torch under conditions to form acetylene from hydrocarbons in said feed, introducing a finely divided inert solid heat carrier medium into said contacting to increase efficiency of said contacting by improving heat transfer between said plasma stream and said reactant, introducing the remainder of said feed which is not preheated into the effluent from said contacting to preheat and crack same while simultaneously quenching said plasma stream, separating light hydrocarbons contained in said effluent from said acetylene, returning at least part of said separated light hydrocarbon to be mixed with said preheated feed and returning at least another part of said separated light hydrocarbon and introducing same into said effluent from said contacting as a quench material.

4. A process for the production of acetylene which comprises introducing a hydrocarbon feed comprised principally of normally gaseous paraffin hydrocarbons into a high temperature hydrogen plasma stream as quench so as to simultaneously effect cooling of said plasma stream and crack and convert at least a portion of said hydrocarbon feed to less saturated hydrocarbons, removing quenched effluent and separating hydrogen, acetylene and hydrocarbons therefrom, and recycling hydrocarbons removed from said separation as reactant feed to said plasma stream and contacting said feed with said plasma stream to convert said recycled hydrocarbons to acetylene and other light hydrocarbons.

5. A process according to claim 4 wherein a portion of the hydrocarbon stream recovered from said separation is utilized as quench for simultaneously cooling said plasma stream to below the cracking temperature of said normally gaseous paraffin hydrocarbons and to convert hydrocarbon materials in said recycle to less saturated hydrocarbons.

References Cited by the Examiner

UNITED STATES PATENTS

| | | | |
|---|---|---|---|
| 1,904,426 | 4/1933 | Eisenhut | 204—171 |
| 2,916,534 | 12/1959 | Shallus et al. | 260—679 |
| 2,985,698 | 5/1961 | Pechtold et al. | 260—679 |
| 3,051,639 | 8/1962 | Anderson | 260—679 |
| 3,060,247 | 10/1962 | Wolfram et al. | 260—679 |
| 3,116,343 | 12/1963 | Diesler | 260—679 |

ALPHONSO D. SULLIVAN, *Primary Examiner.*